J. R. LANGLEY.
STARTING SYSTEM FOR AUTOMOBILES.
APPLICATION FILED JULY 29, 1913.
1,246,761.
Patented Nov. 13, 1917.
2 SHEETS—SHEET 1.
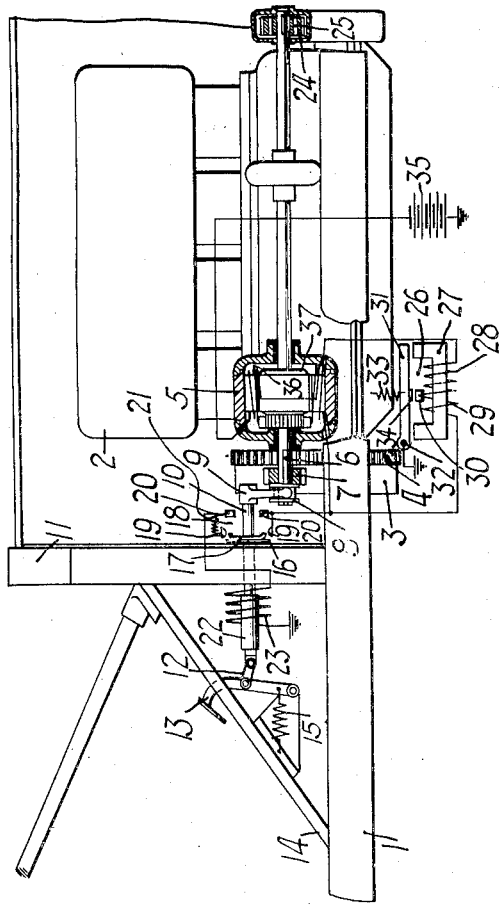
Fig. 1.
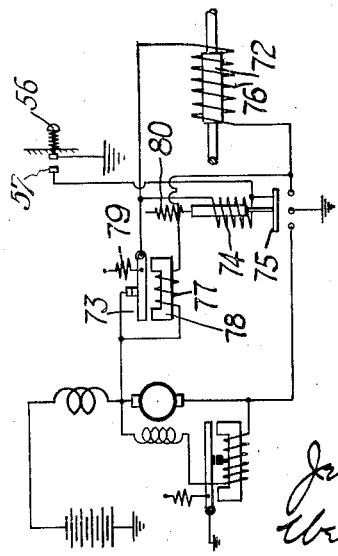
WITNESSES:
INVENTOR
Jesse R. Langley
BY
ATTORNEY

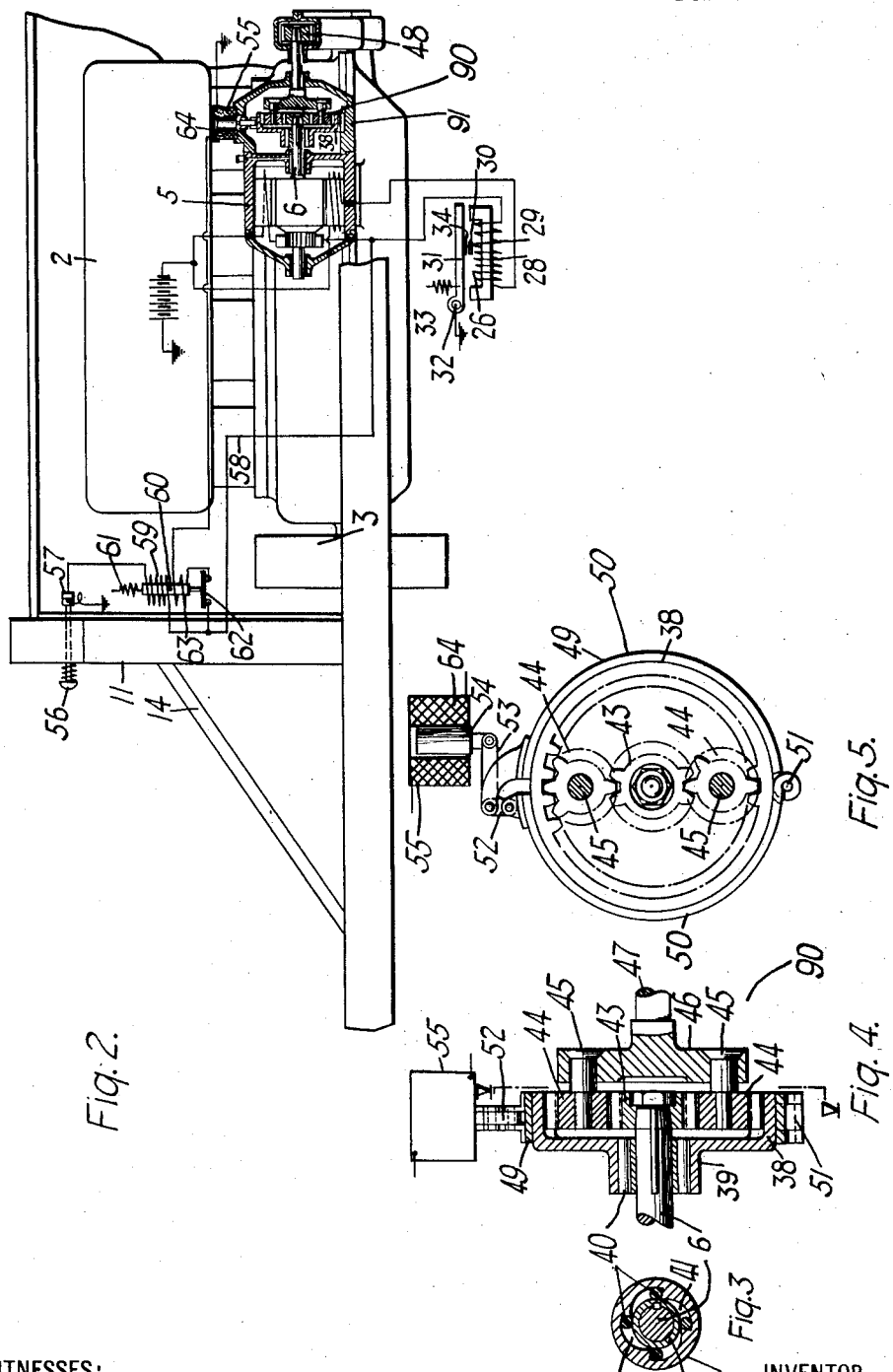

UNITED STATES PATENT OFFICE.

JESSE R. LANGLEY, OF SWISSVALE, PENNSYLVANIA, ASSIGNOR TO WESTINGHOUSE ELECTRIC AND MANUFACTURING COMPANY, A CORPORATION OF PENNSYLVANIA.

STARTING SYSTEM FOR AUTOMOBILES.

1,246,761.   Specification of Letters Patent.   Patented Nov. 13, 1917.

Application filed July 29, 1913. Serial No. 781,755.

*To all whom it may concern:*

Be it known that I, JESSE R. LANGLEY, a citizen of the United States, and a resident of Swissvale, in the county of Allegheny and State of Pennsylvania, have invented a new and useful Improvement in Starting Systems for Automobiles, of which the following is a specification.

My invention relates to starting systems for automobiles and it has particular reference to such systems as comprise dynamo-electric machines which may be operated either as motors or as generators.

My invention has for one of its objects to provide a system of the above indicated character which operates automatically, under predetermined circuit conditions, to change the speed ratio employed between the dynamo-electric machine and the shaft of an internal combustion engine.

In the operation of generators which act as motors to start the gas engines of automobiles or other motor vehicles and then act as generators to charge storage batteries, it is highly desirable to employ gear mechanism having different speed ratios for the separate operations. When a generator is operated as a motor, a gear mechanism having a large speed reduction is customarily employed to connect the generator to the engine shaft. This arrangement permits the employment of a small generator which may be operated at a high speed in starting the engine. It is obvious that, when the engine starts under its own power, the generator would be driven at an excessive speed if the same speed ratio were maintained. It is, therefore, essential that the change of speed ratio take place before the engine attains its normal speed.

My invention comprises a generator which operates as a motor through suitable reduction gear mechanism to start a gas engine and then operates as a generator at another speed ratio to furnish current for charging a storage battery or for ignition and lighting purposes, if desired. The motor circuit conditions are utilized to effect the changes of speed ratios automatically at substantially the instant the engine starts. I employ a magnet, the actuating coil of which is energized according to the current traversing the motor circuit. The magnet controls the mechanism for changing the speed ratio. It will be understood that the change of speed ratio may be effected entirely independent of the action of the engine.

The details of my invention will be described in connection with the accompanying drawings in which Figure 1 is a side view, partially in section and partially in elevation, of a portion of an automobile with my invention applied thereto, certain of the apparatus and the electrical circuits being shown diagrammatically. Fig. 2 is a view similar to that of Fig. 1, of a modification of my invention. Fig. 3 is a view in section of a roller clutch. Fig. 4 is a view in section of a planetary gear mechanism and related parts, parts being broken away. Fig. 5 is an end view, partially in elevation and partially in section on the line V—V in Fig. 4, of the mechanism shown in Fig. 4. Fig. 6 is a diagrammatic view of circuits and apparatus embodying a second modification. Fig. 7 is a view, similar to Fig. 6 of a third modification.

Referring particularly to Fig. 1, an automobile 1 is provided with the usual gas engine 2. The engine 2 comprises a fly wheel 3 that is mounted on the engine shaft (not shown) and is provided with gear teeth 4. A dynamo 5, which is adapted to operate as a motor for starting the engine, is attached to any suitable portion of the engine structure. The dynamo shaft is provided, at one end, with a pinion 7 which is slidable into and out of mesh with the fly wheel gear teeth 4. The speed ratio between the fly wheel and the pinion 7 may be any desired, as for example, 18:1. The pinion 7 is provided with a grooved collar 8 to be engaged by a yoke member 9 that is fixed on a slidable shift rod 10. The shift rod 10 extends through a suitable opening in the dash-board 11 and is connected by a link 12 to a pivoted pedal 13 that extends through a suitable opening in the footboard 14. The pinion 7 is normally held in its inoperative position by a spring 15 that is connected to the pedal 13 and to the foot board 14.

The shift rod 10 carries contact disks 16 and 17 which constitute the movable elements of a starting switch 18. The disks 16 and 17 coact, respectively, with stationary contact clips 19 and contact members 20. A resistor 21 is connected to one of the contact clips 19 and to one of the contact members 20.

The shift rod 10 is provided with an enlarged portion 22 which constitutes the core of a magnet coil 23. The coil 23 is connected in series with the dynamo 5 when the starting switch 18 is closed, the coil 23 then acting as a holding coil to maintain the operative connection of the pinion 7 to the gear teeth 4 as long as the current in the motor circuit is above a predetermined value.

The opposite end of the armature shaft 6 is provided with a pinion 24 which is connected to the shaft 6 by a roller clutch 25 similar to that illustrated in Fig. 4. The pinion 24 is permanently connected to the engine shaft through a suitable gear mechanism (not shown) and the cam shaft (not shown) or other suitable engine parts. The speed ratio between the dynamo and the engine shaft through this connection is preferably 1:1.

The charging circuit of the dynamo, when operating as a generator, is controlled by a cut-out 26 which comprises a core member 27 and coils 28 and 29 that surround the core member 27. The coils 28 and 29, which are connected in shunt and in series, respectively, with the dynamo armature, are connected at a common point to a contact member 30. The cut out 26 is provided with an armature 31 which has a pivotal support indicated at 32 and is normally held upward by a spring 33. The armature 31 carries a contact member 34 which engages the contact member 30 when the coils 28 and 29 are sufficiently energized to draw the armature 31 downwardly.

It may be assumed that the various parts are stationary and in their respective inoperative positions. To start the engine, the operator presses the pedal 13 forwardly to shift the rod 10. A slight movement of the latter causes the contact disk 16 to engage the contact clips 19 and thereby temporarily complete the circuit for operating the dynamo as a motor. The circuit extends from the ungrounded side of a battery 35, through the series field winding 36 and armature 37, a contact clip 19, disk 16, the second contact clip 19, the resistor 18 and coil 23 to ground and back to the battery. The armature then rotates slowly by reason of the relatively high resistance of its circuit. Further movement of the rod 10 breaks the dynamo circuit and the armature rotates only because of its inertia. The pinion 7 is then easily meshed with the gear teeth 4. The contact disk 17 engages the contact members 20 when the pinion is fully meshed and thereby completes the running circuit for operation as a motor, the resistor 18 being omitted. The coil 23 is then energized to act as a holding coil for the core member 22, and the operator may release the pedal 13.

The current value in the dynamo circuit will be relatively high at first, but will decrease as the speed of the engine shaft increases and, at the instant the engine starts, it will be almost zero. When the current reaches a predetermined minimum value, the spring 15 overcomes the force of the coil 23, and the shift rod 10 is drawn outwardly to break the motor circuit and to disengage the pinion 7 from the gear teeth 4. The current value at which the shift rod is returned to its normal position may be determined by adjusting the relative strengths of the spring 15 and the coil 23.

In the modification of my invention illustrated in Figs. 2, 3, 4 and 5 like numerals designate corresponding parts. The dynamo 5 is connected to the engine shaft by a planetary gear mechanism 90 inclosed by a casing 91.

Referring particularly to Figs. 3, 4 and 5, an internal gear wheel 38 is provided with a flange or collar 39 which is connected to the armature shaft 6 by a one-way roller clutch comprising rollers 40 mounted in inclined grooves 41 and a sleeve 42 that is fixed to the armature shaft 6. A pinion 43 is mounted on the armature shaft 6 and meshes with two oppositely disposed pinions 44 which, in turn, mesh with the internal gear wheel 38. The pinions 44 are rotatably mounted upon pins 45 that are carried by a member 46. A rotatable shaft 47 is fixed at one end to the member 46 and, at the other end, it carries a pinion 48 which is connected by a suitable gear mechanism (not shown) to any suitable rotating part of the engine. The gear wheel 38 is provided exteriorly with a band brake 49 comprising a band 50 in two parts which are pivotally connected at 51. The other ends of the band are connected by a lever 52, the power arm 53 of which is connected to the movable core 54 of a magnet 55.

A push button 56 upon the dash board 11 is actuated to close a switch 57 which completes a circuit from the ungrounded side of the battery through the dynamo windings, conductor 58, a coil 59 and the switch 57 to ground. The coil 59 is thereby energized to draw a movable core member 60 downwardly against the tension of a spring 61 to close a switch 62. The closing of the switch 62 energizes a holding coil 63 which is adjusted to maintain the closure of the switch until the current falls to a predetermined value. The push button may then be released. The closure of the switch 62 completes the motor circuit through the coil 64 of the magnet 55, and the magnet core 54 is drawn upwardly to set the brake 49.

The dynamo then operates as a motor, in a clockwise direction, to rotate the engine shaft through the armature shaft 6, pinion 43, pinion 44, member 46, shaft 47, and pinion 48. The speed ratio between the armature shaft 6 and the pinion 48 may be arranged as desired by varying the relative numbers of teeth of the pinion 43 and the pinions 44. In a practical embodiment of the same, the system operates as a reduction gear mechanism with a speed ratio, for example, 18:1. When the current value, which decreases as the motor speed increases because of the counter electromotive force of the motor armature, has fallen to a predetermined value, the spring 61 retracts the core member 60 and opens the switch, thereby breaking the motor circuit and deënergizing the magnet coil 64. The brake 49 then releases the gear wheel.

When the engine starts, it becomes the driving member and power is transmitted through the pinion 48, shaft 47 and member 46 to the planet pinions 44. The armature tends to remain stationary while the gear wheel 38 is free to rotate. The result, therefore, is to effect the engagement of the roller clutch which does not permit the collar 39 to overrun the armature shaft in a clockwise direction. As a result, the entire mechanism operates as a unit, without relative movement of its parts, to rotate the armature 6 at the same speed as the pinion 48.

It may be noted that, after the engine has started, it will be impossible to operate the brake because the speed of the dynamo is sufficiently high to generate an electromotive force which opposes that of the battery to such a degree that the coil 59 is not sufficiently energized to actuate the core member 60. When the speed of the dynamo, operating as a generator, has reached a predetermined rate, the cut-out 26 operates, in the manner above described in connection with Fig. 1, to close the charging circuit of the generator. The closing of the charging circuit operates to short circuit the switch coils 59 and 63.

In the modification shown in Fig. 6, the actuation of the push button 56 closes a circuit from the ungrounded side of the battery through the series field winding 66, dynamo armature, magnet coil 67 and switch 57 to ground. The coil 67 is thereby energized to close the switch 68 against the tension of a spring 69 and connect a holding coil 70 in series with the armature. The switch 68 also closes a shunt circuit comprising a magnet coil 71 surrounding a core member 72 which may be either the core member 22 of Fig. 1 or the core member 54 of the brake magnet of Figs. 2, 4 and 5. The holding coil 70 is arranged to release the switch 68 when the current falls to a predetermined value. The coil 71 will thereby be deënergized to release the brake 49 or the shift rod 10, as the case may be, and to effect a change in the gear ratio of the corresponding mechanism. The operation of the cut-out 26 has been described above.

An additional modification is diagrammatically illustrated in Fig. 7. Actuation of the push button 56 closes a switch 57 to complete a circuit from the ungrounded side of the battery through a relay switch 73, coil 74, and switch 57 to ground. The coil 74 is energized to close a switch 75 and thereby cause the coil 74 to act as a shunt holding coil. The switch 75 completes a circuit from the battery through the dynamo windings and a shunt circuit through a coil 76 surrounding a movable core member 72 which may be either the shift rod 22 or the brake magnet core 54 of Figs. 1 and 5, respectively. A shunt circuit is also closed through the coil 77 of a magnet 78 which controls the switch 73. The core member 72 is actuated by the coil 76 to mesh the pinion 7 with the fly wheel gear teeth 4 or to set the brake 49, as the case may be.

When the switch 75 first closes there will be a large drop in potential across the armature terminals of the generator. As the generator speed increases, the counter electromotive force of the generator armature also increases and an increased amount of current flows through the shunt coil 77 of the magnet 78. When the coil 77 is energized to a predetermined degree, the relay switch 73 is opened against the tension of a spring 79 to break the circuit of the holding coil 74. The switch is then opened by a spring 80 and the circuits of the coils 74, 76 and 77 will be opened thereby. The spring 79 will then close the relay switch 73 in readiness for the next starting operation. The movable member 72 will be returned by any suitable spring (not shown) to shift the pinion 7 out of mesh with the fly wheel gear 4 or to release the brake 49 and thereby change the speed ratio of the respective connecting mechanisms. The charging circuit will be controlled as described above.

It will be noted that I have provided a means whereby the speed ratio of the connecting gear mechanism may be shifted, at any desired point in the operation, by the adjustment of the coils for predetermined current or voltage values, as the case may be. These values are preferably adjusted so that the change in connection is made at approximately the instant of the starting of the gas engine.

I claim as my invention:

1. The combination with an engine shaft and a dynamo-electric machine, of means for operatively connecting said dynamo-electric machine to said engine shaft at different speed ratios, and means for changing said speed ratios when the counter-electromotive force of said dynamo-electric machine reaches a predetermined value.

2. The combination with an engine shaft and a dynamo-electric machine, of means for operatively connecting said dynamo-electric machine to said engine shaft to operate at different speed ratios as a motor and as a generator, and means for changing from one ratio to the other when the counter-electromotive force of said dynamo-electric machine reaches a predetermined value.

3. The combination with an engine shaft and a dynamo-electric machine, of means for operatively connecting said dynamo-electric machine to said engine shaft for operation either as a motor or as a generator, and means controlled in accordance with the value of the counter-electromotive force of said dynamo-electric machine for preventing the arrangement of said connecting means for motor operation.

4. The combination with an engine shaft, a dynamo-electric machine, and means for operatively connecting them, of electro-responsive means in series with said dynamo-electric machine for effecting its operative connection to the engine shaft for operation as a motor and means in circuit with said dynamo-electric machine for rendering said electro-responsive means inoperative when the counter-electromotive force of said dynamo-electric machine exceeds a predetermined value.

In testimony whereof, I have hereunto subscribed my name this 25th day of July, 1913.

JESSE R. LANGLEY.

Witnesses:
J. H. PROCTER,
B. B. HINES.